US 8,605,881 B2

(12) United States Patent
Buzdugan (10) Patent No.: US 8,605,881 B2
(45) Date of Patent: Dec. 10, 2013

(54) AUTO PROMOTION AND DEMOTION OF CONFERENCE CALLS (75) Inventor: Marian Buzdugan, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/285,247

(22) Filed: Oct. 31, 2011
(Under 37 CFR 1.47)

(65) Prior Publication Data
US 2013/0108033 A1    May 2, 2013

(51) Int. Cl.
H04M 3/42    (2006.01)
G06F 15/16   (2006.01)

(52) U.S. Cl.
USPC ............ 379/202.01; 379/201.01; 379/204.01; 455/416; 709/204

(58) Field of Classification Search
USPC ............ 379/202.01, 201.01, 203.01, 204.01, 379/205.01; 709/204; 455/416
See application file for complete search history.

(56) References Cited

U.S. PATENT DOCUMENTS

| | | | |
|---|---|---|---|
| 4,544,804 A | 10/1985 | Herr et al. | |
| 5,212,726 A | 5/1993 | Dayner et al. | |
| 5,373,549 A | 12/1994 | Bales et al. | |
| 5,859,979 A | 1/1999 | Tung et al. | |
| 5,973,724 A | 10/1999 | Riddle | |
| 7,161,926 B2 | 1/2007 | Elson et al. | |
| 7,697,490 B2 | 4/2010 | Dssouli et al. | |
| 7,822,186 B1 | 10/2010 | Boni | |
| 7,849,138 B2 | 12/2010 | Gu et al. | |
| 7,865,180 B2 | 1/2011 | Davis et al. | |
| 7,933,621 B1 | 4/2011 | Vu et al. | |
| 2003/0144004 A1 | 7/2003 | Canova et al. | |
| 2003/0223562 A1 | 12/2003 | Cui et al. | |
| 2005/0063313 A1 | 3/2005 | Nanavati et al. | |
| 2005/0278424 A1* | 12/2005 | White | 709/204 |
| 2007/0086365 A1 | 4/2007 | Chen et al. | |
| 2007/0264989 A1 | 11/2007 | Palakkal et al. | |
| 2008/0239995 A1 | 10/2008 | Lee et al. | |
| 2009/0086951 A1 | 4/2009 | Geppert et al. | |
| 2009/0089683 A1 | 4/2009 | Thapa | |
| 2010/0007713 A1 | 1/2010 | Yamamoto | |
| 2010/0220635 A1 | 9/2010 | Gisby et al. | |

FOREIGN PATENT DOCUMENTS

WO    97/32256 A1    9/1997
WO    02087204       10/2002

OTHER PUBLICATIONS

Extended European Search Report mailed Mar. 22, 2012, for European Application No. 11187303.0.

* cited by examiner

Primary Examiner — Thjuan K Addy
(74) Attorney, Agent, or Firm — Finnegan, Henderson, Farabow, Garrett & Dunner, LLP (57) ABSTRACT Methods and systems are provided for managing conference calls. The method includes establishing a first conference call between a host terminal device and one or more participant terminal devices; receiving a request for adding a non-participant terminal device into the first conference call; selecting a participant terminal device from the one or more participant terminal devices to host a second conference call; establishing the second conference call hosted by the selected participant terminal device; and chaining the first conference call and the second conference call through the selected participant terminal device.

20 Claims, 8 Drawing Sheets

AUTO PROMOTION AND DEMOTION OF CONFERENCE CALLS

FIELD

The present application relates to conference call systems and methods in general and to auto promotion and demotion of conference calls in particular.

BACKGROUND

A conference call system allows one or more called parties to participate in a conference during a call from their own devices. Typically, a conference call is hosted by a calling party. The conference call system is designed so that the calling party calls other participants and adds them to a conference call. Alternatively, the participants are provided with a telephone number and an access code and are able to connect to a conference bridge by dialing the telephone number and the access code.

But difficulties exist in attempting to add more participants to a conference call when the maximum number of participants supported by the system is reached. Other difficulties with existing teleconferencing systems will also be apparent to those skilled in the art in view of the detailed description below.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some embodiments of the present application provide a method for managing conference calls in an enterprise network system. The method includes establishing a first conference call between a host terminal device and one or more participant terminal devices; receiving a request for adding a non-participant terminal device into the first conference call; selecting a participant terminal device from the one or more participant terminal devices to host a second conference call; establishing the second conference call hosted by the selected participant terminal device, the second conference call including the non-participant terminal device; and chaining the first conference call and the second conference call through the selected participant terminal device.

In some alternative embodiments, the present application provides a non-transitory computer readable medium comprising computer-readable instructions, which, when executed by a processor, causes the processor to perform the method described herein.

In still some alternative embodiments, the present application provides a system including a host terminal device, one or more participant terminal devices, and a server for managing conference calls as described herein.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to conference call management. Although "call" or "calls" are referenced to in the description of example embodiments below, it will be appreciated that the described systems and methods are applicable to session-based communications in general and are not limited to voice calls. It will also be appreciated that the systems and methods are not limited to sessions and are applicable to messaging-based or packet-based communications in some embodiments. Reference to calls can, for example, include shared data (e.g., presentation content) as well as media sessions which can, for example, include video and/or audio.

Figure 1:
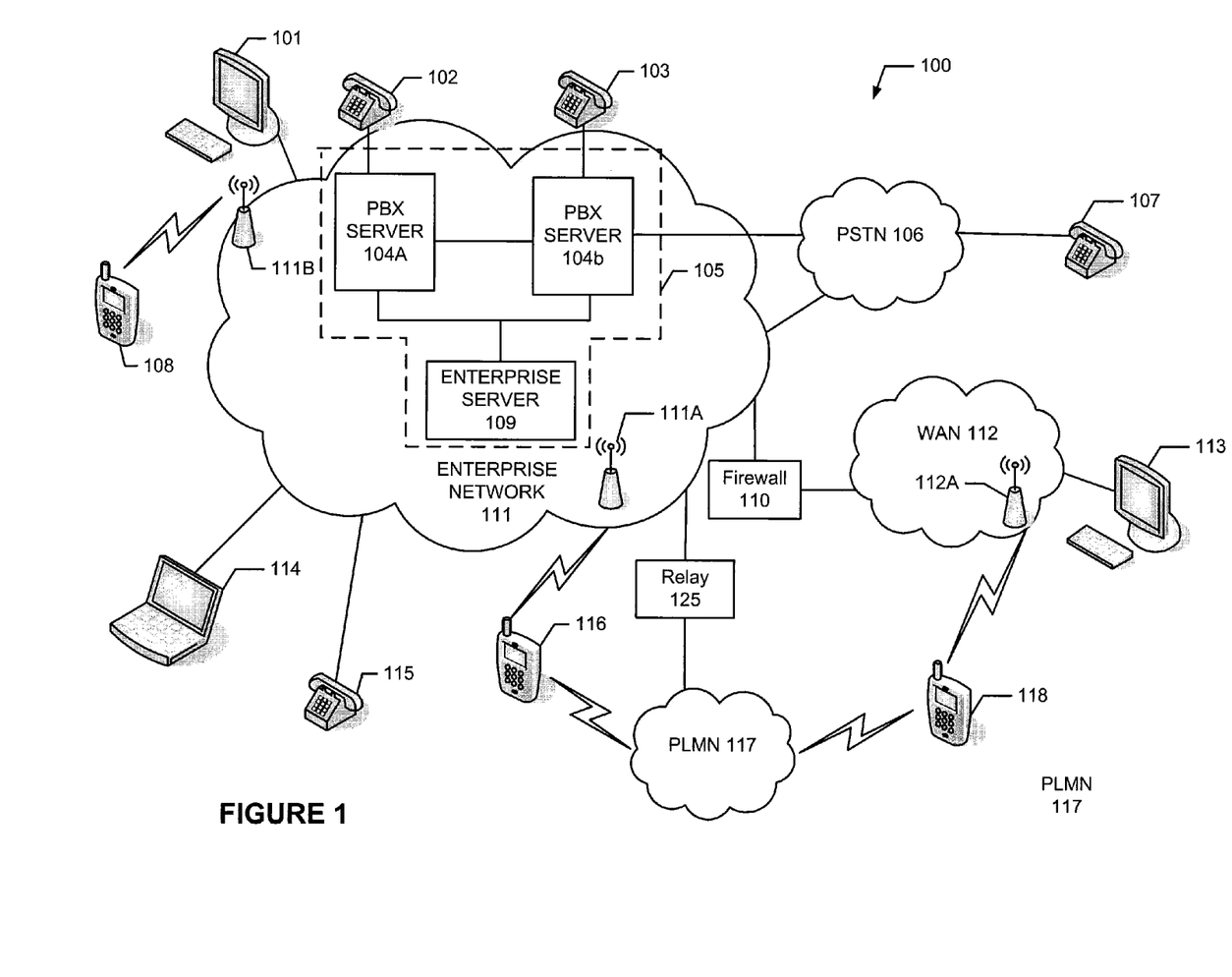
FIG. 1 shows, in block diagram form, an example system for managing conference calls according to an example embodiment.

Reference is now made to FIG. 1, which shows, in block diagram form, an example system, generally designated as 100, for control and management of conference calls. System 100 includes an enterprise network 111, which in some embodiments includes a local area network (LAN). In some embodiments, enterprise network 111 can be an enterprise or business system. In some embodiments, enterprise network 111 includes more than one network and is located in multiple geographic areas.

Enterprise network 111 can be connected, often through a firewall 110, to a wide area network (WAN) 112, such as the Internet. Enterprise network 111 can also be connected to a public switched telephone network (PSTN) 106 via direct inward dialing (DID) trunks or primary rate interface (PRI) trunks.

Enterprise network 111 can also communicate with a public land mobile network (PLMN) 117, which is also referred to as a wireless wide area network (WWAN) or, in some cases, a cellular network. The connection with PLMN 117 is via a relay 125, as known in the art.

In some embodiments, enterprise network 111 provides a wireless local area network (WLAN), not shown, featuring wireless access points, such as wireless access point 111A and 111B. In some embodiments, other WLANs can exist outside of enterprise network 111. For example, a WLAN connected to WAN 112 can be accessed via wireless access point 112A. WAN 112 is coupled to one or more mobile devices, for example mobile device 118. Additionally, WAN 112 can be connected to one or more desktop or laptop computers 113.

System 100 can include a number of enterprise-associated mobile devices, for example, mobile devices 108, 116, and 118. Mobile devices 108, 116, and 118 can include devices equipped for cellular communications through PLMN 117, mobile devices equipped for Wi-Fi communications over one of the WLANs via wireless access points 111A, 111B, or 112A, or dual-mode devices capable of both cellular and WLAN communications. Wireless access points 111A, 111B, or 112A can be configured to WLANs that operate in accordance with one of the IEEE 802.11 specifications. In some embodiments, the memory stores user-profile information, including unique device identifiers, for example a device personal identification number (PIN), user identifier, place of employment, location data, work phone number, home address, etc. Additionally, the memory can store information relating to various people, for example, name of a user, a user's identifier (user name, email address, or any other identifier), place of employment, location data, work phone number, home address, device PIN, etc.

Mobile devices 108, 116, and 118 can be, for example, cellular phones, smartphones, tablets, netbooks, and a PDA (personal digital assistant) enabled for wireless communication. Moreover, mobile devices 108, 116, and 118 can communicate with other components using voice communications or data communications (such as accessing content from a website). Mobile devices 108, 116, and 118 include devices equipped for cellular communications through PLMN 117, devices equipped for Wi-Fi communications via wireless access points 111A, 111B, or 112A, or dual-mode devices capable of both cellular and WLAN communications. Mobile devices 108, 116, and 118 are described in detail below in FIG. 2.

Mobile devices 108, 116, and 118 also include one or more radio transceivers and associated processing hardware and software to enable wireless communications with PLMN 117, and/or one of the WLANs via wireless access points 111A, 111B, and 112A. In various embodiments, PLMN 117 and mobile devices 108, 116, and 118 are configured to operate in compliance with any one or more of a number of wireless protocols, including GSM, GPRS, CDMA, EDGE, UMTS, EvDO, HSPA, 3GPP, or a variety of others. It will be appreciated that mobile devices 108, 116, and 118 can roam within PLMN 117 and across PLMNs, in known manner, as their user moves. In some instances, dual-mode mobile devices 108, 116, and 118 and/or enterprise network 111 are configured to facilitate roaming between PLMN 117 and a wireless access points 111A, 111B, or 112A, and are thus capable of seamlessly transferring sessions (such as voice calls) from a connection with the cellular interface of dual-mode device (i.e., mobile devices 108, 116, and 118) to a WLAN interface of the dual-mode device, and vice versa.

System 100 typically includes a number of networked servers, computers, and other devices. For example, in some embodiments system 100 connects one or more computers 101, 114, and 113. The connection can be wired or wireless in some embodiments. Computers 101, 114, and 113 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible nontransitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

System 100 can also connect one or more telephone sets 102, 103, 107, and 115. Telephone sets 102, 103, 107, and 115 are capable of conducting telephone calls over enterprise network 109. Telephone sets 102, 103, 107, and 115 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions stored in the memory. The memory includes a tangible nontransitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

For ease of description, mobile devices 108, 116, and 118, computers 101, 114, and 113, and telephone sets 102, 103, 107, and 115 are referred to as terminal devices. These terminal devices are capable of conducting voice or video conference calls through system 100. The terminal devices will be further discussed below.

Relay 125 serves to route communications received over PLMN 117 from mobile device 118 to the corresponding enterprise network 111. Relay 125 also routes communications from enterprise network 111 to mobile device 118 via PLMN 117.

As is typical in many enterprises, enterprise network 111 includes one or more Private Branch eXchanges 104A and 104B ("PBX"; although in various embodiments the PBX can be a standard PBX or an IP-PBX, for simplicity the description below uses the term PBX to refer to both) connected to PSTN 106 for routing incoming and outgoing communications for the enterprise. PBXs 104A and 104B are connected to PSTN 106 via DID trunks or PRI trunks, for example. PBXs 104A and 104B can use ISDN signaling protocols for setting up and tearing down circuit-switched connections through PSTN 106 and related signaling and communications. In some embodiments, PBX's 104A and 10413 can be connected to one or more telephone sets 102 and 103. PBX's 104A and 10413 are also connected to enterprise network 111 and, through it, to terminal devices, such as telephone set 115, softphones operating on computers 101, 113, and 114, etc. Within the enterprise, each individual can have an associated extension number, sometimes referred to as a PNP (private numbering plan), or direct dial phone number. Calls outgoing from PBX's 104A and 104B to PSTN 106 or incoming from PSTN 106 to PBX's 104A and 104B are typically circuit-switched calls. Within the enterprise, e.g. between PBX's 104A and 104B and terminal devices, voice calls are often packet-switched calls, for example Voice-over-IP (VoIP) calls.

Enterprise network 111 also includes an enterprise server 109 for performing certain aspects of messaging or session control, such as call control and advanced call processing features. Enterprise server 109 can, in some cases, also perform media handling. Collectively enterprise server 109 and PBX's 104A and 104B can be referred to as an enterprise communications platform 105. Enterprise communications platform 105 functions to control and manage incoming communications addressed to a terminal device within enterprise network 111 and outgoing communications addressed to a terminal device within WAN 112, PLMN 117, PSTN 106, or elsewhere.

It will be appreciated that enterprise communications platform 105 and, in particular, enterprise server 109 can be implemented on one or more servers having suitable communications interfaces for connecting to and communicating with other system components. Enterprise server 109 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible nontransitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. In some embodiments, the memory stores user-profile information, including unique device identifiers, for example a device personal identification number (FIN). Additionally, the memory can store information relating to various people, for example, name of a user, a user's identifier (user name, email address, or any other identifier), location data, place of employment, work phone number, home address, device PIN, etc.

Enterprise communications platform 105 implements the switching to connect session legs and provides the conversion between, for example, a circuit-switched call and a VoIP call, or to connect legs of other media sessions. In some embodiments, in the context of voice calls, enterprise communications platform 105 provides a number of additional functions including automated attendant, interactive voice response, call forwarding, conference call, etc. It can also implement certain usage restrictions on enterprise users, such as blocking international calls or toll free calls. In many embodiments, Session Initiation Protocol (SIP) can be used to set-up, manage, and terminate media sessions for voice calls. Other protocols can also be employed by enterprise communications platform 105, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater details below.

One of the functions of enterprise communications platform 105 is to extend the features of enterprise telephony to the terminal devices connected to system 100. For example, enterprise communications platform 105 can allow mobile devices 108, 116, and 118 and computers 101, 113, and 114 to perform functions akin to those normally available on a standard office telephone, such as telephone sets 102, 103, 107, and 115. Example features can include direct extension dialing, enterprise voice mail, conferencing, call transfer, call park, etc. Enterprise server 109 will be further discussed below.

Figure 2:
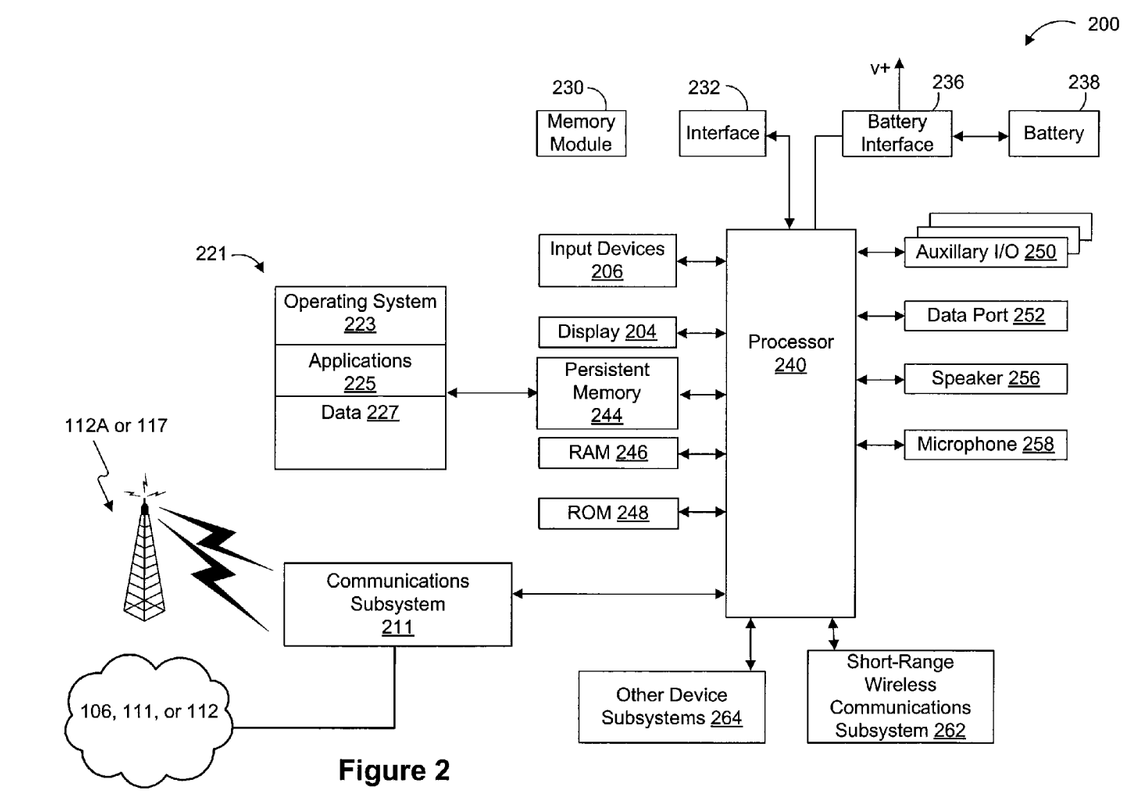
FIG. 2 shows a block diagram illustrating a mobile communication device in accordance with an example embodiment.

Reference is now made to FIG. 2 which illustrates an example embodiment for a terminal device 200, which can be used to implement mobile devices 108, 116, and 118, computers 101, 114, and 113, and telephone sets 102, 103, 107, and 115. As depicted in FIG. 2, terminal device 200 is a two-way communication device having data and voice communication capabilities, and the capability to communicate with other computer systems, for example, via the Internet. Depending on the functionality provided by terminal device 200, in various embodiments terminal device 200 can be a handheld device, a multiple-mode communications device configured for both data and voice communications, a smartphone, a mobile telephone, a tablet, or a PDA (personal digital assistant) enabled for wireless communications or other devices enabled for wired communications.

Terminal device 200 includes a rigid case (not shown) housing the components shown in FIG. 2. The internal components of terminal device 200 can, for example, be constructed on a printed circuit board (PCB). The description of terminal device 200 herein mentions a number of specific components and subsystems. Although these components and subsystems can be realized as discrete elements, the functions of the components and subsystems can also be realized by integrating, combining, or packaging one or more elements in any suitable fashion.

Terminal device 200 includes a controller comprising at least one processor 240 (such as a microprocessor), which controls the overall operation of terminal device 200. Processor 240 interacts with device subsystems such as a communications subsystem 211 for exchanging signals with the various networks (e.g. PSTN, 106, enterprise network 111, WAN 112, and/or PLMN 117), to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range wireless communications subsystem 262 (which can employ any appropriate wireless (e.g., RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface connected to an electronic controller and which overlays the visible element of display 204. The touch-sensitive overlay and the electronic controller provide a touch-sensitive input device and processor 240 interacts with the touch-sensitive overlay via the electronic controller.

Communications subsystem 211 includes one or more communication systems for communicating with PSTN 106, enterprise network 111, WAN 112, and/or PLMN 117 through wireless or wired connections. The particular design of communications subsystem 211 depends on the network in which terminal device 200 is intended to operate. Terminal device 200 can send and receive communication signals over the various networks after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions or both, in some embodiments is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including a device PIN. Persistent memory 244 also can store information relating to various people, for example, name of a user, a user's identifier (user name, email address, or any other identifier, device PIN), place of employment, work phone number, home address, etc. Persistent memory 244 can additionally store one or more security keys related to workgroup generation.

Software modules 221 or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to voice communication (i.e., telephony) application, e-mail messaging application, address book, calendar application, notepad application, Internet browser application, mapping application, or a media player application, or any combination thereof. Each of software applications 225 can include layout information defining the placement of particular fields and graphic elements (e.g., text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on terminal device 200 (for example, receipt of an electronic message or incoming phone call), or for other purposes such as haptic feedback (touch feedback).

In some embodiments, terminal device 200 also includes one or more removable memory modules 230 (typically comprising FLASH memory) and one or more memory module interfaces 232. Among possible functions of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module or SIM. Memory module 230 is inserted in or connected to memory module interface 232 of terminal device 200 in order to operate in conjunction with the wireless network.

Terminal device 200 stores data 227 in persistent memory 244. In various embodiments, data 227 includes service data comprising information required by terminal device 200 to establish and maintain communications with the wireless network (for example WAN 115 and/or PLMN 120). For example, data 227 can include user-profile information, including unique device identifiers, for example a device personal identification number (PIN). Additionally, the memory can store information relating to various people, for example, name of a user, a user's identifier (user name, email address, or any other identifier), place of employment, work phone number, location information, home address, device PIN, etc.

In some embodiment, terminal device 200 also includes a battery 238 which furnishes energy for operating terminal device 200. Battery 238 can be coupled to the electrical circuitry of terminal device 200 through a battery interface 236, which can manage such functions as charging battery 238 from an external power source (not shown) and the distribution of energy to various loads within or connected to terminal device 200. Short-range wireless communications subsystem 262 is an additional optional component which provides for communications between terminal device 200 and different systems or devices, which need not necessarily be similar devices. For example, short-range wireless communications subsystem 262 can include an infrared device and associated circuits and components, or a wireless bus protocol compliant communication mechanism such as a BLUETOOTH communication module to provide for communications with similarly-enabled systems and devices.

A predetermined set of applications that control basic device operations, including data and possibly voice communication applications can be installed on terminal device 200 during or after manufacture. Additional applications and/or upgrades to operating system software 223 or software applications 225 can also be loaded onto terminal device 200 through the networks (for example, PSTN 106, enterprise network 111, WAN 115, and/or PLMN 120), auxiliary I/O subsystem 250, data port 252, short-range wireless communications subsystem 262, or other suitable subsystem such as 264. The downloaded programs or code modules can be permanently installed, for example, written into the program memory (for example, persistent memory 244), or written into and executed from RAM 246 for execution by processor 240 at runtime.

Terminal device 200 can provide two principal modes of communication: a data communication mode and a voice communication mode. In the data communication mode, a received data signal such as a text message, an e-mail message, Web page download, or an image file are processed by communications subsystem 211 and input to processor 240 for further processing. In the voice communication mode, terminal device 200 provides telephony functions and operates as a cellular phone or landline telephone.

Figure 3A:
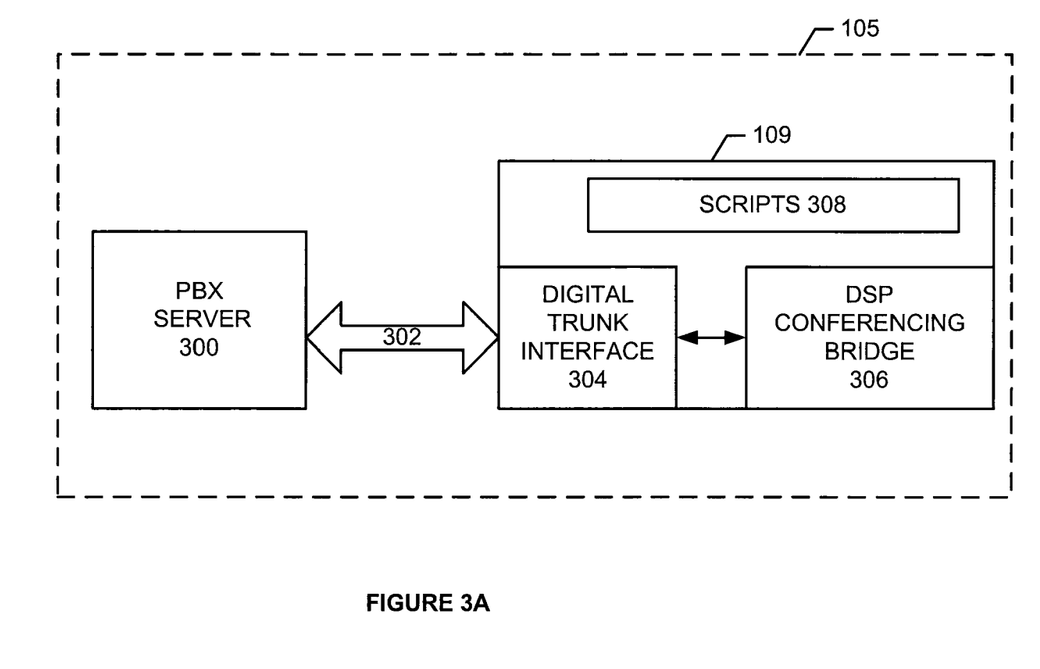
FIG. 3A shows, in block diagram form, further details of an embodiment of the enterprise communications platform.
Figure 3B:
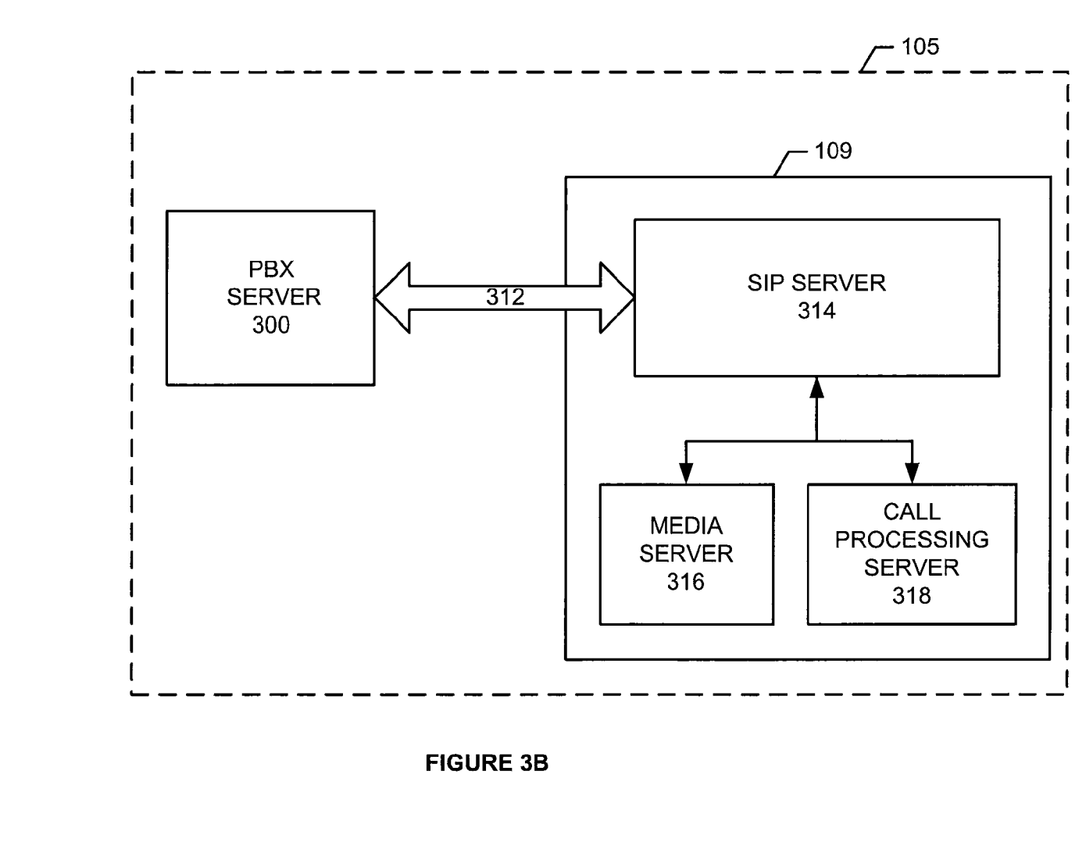
FIG. 3B shows another embodiment of the enterprise communications platform.

Reference is now made to FIGS. 3A and 3B, which show example embodiments of enterprise communications platform 105. Again, although references are made below to "calls" or call-centric features, it will be appreciated that the architectures and systems depicted and described are applicable to session-based communications, packet-based communications, and messaging-based communications.

FIG. 3A illustrates an embodiment of enterprise communications platform 105 as depicted in FIG. 1. As shown in FIG. 3A, PBX server 300, which can include PBX 104A or 104B or both as depicted in FIG. 1, is coupled to enterprise server 109 via connection 302. In this embodiment, connection 302 can be a Primary Rate Interface (PRI) connection or other suitable digital trunk. In a further embodiment, connection 302 can include a first PRI connection, a second PRI connection, and a channel service unit (CSU). The CSU is a mechanism for connecting computing devices to digital mediums in a manner that allows for the retiming and regeneration of incoming signals. It will be appreciated that there can be additional or alternative connections between PBX server 200 and enterprise server 109.

According to this embodiment, enterprise server 109 assumes control over both call processing and the media processing. This architecture can be referred to as the "First Party Call Control." In this architecture, many of the media handling functions normally implemented by PBX server 300 are handled by enterprise server 109. Incoming calls addressed to any of the terminal devices connected to enterprise network 111 are first routed to enterprise server 109. Thereafter, a call leg is established from enterprise server 109 to the called terminal device connected to enterprise network 111, and the two legs are bridged. Accordingly, enterprise server 109 includes a digital trunk interface 304 and a digital signal processing (DSP) conferencing bridge 306. DSP conferencing bridge 306 performs the bridging of calls for implementation of various call features, such as conferencing, call transfer, etc. Digital trunk interface 304 can be implemented as a plurality of telephonic cards, such as the Intel™ Dialogic cards, interconnected by a bus and operating under the control of a processor. Digital trunk interface 304 can also be partly implemented using a processor module such as, for example, a Host Media Processing (HMP) processor.

Enterprise server 109 can include various scripts 308 for managing call processing. Scripts 308 are implemented as program modules, routines, functions, etc., stored in a non-transitory computer-readable medium, such as RAM, ROM, flash drive, hard drive, CD-ROM, etc., and executed by the processor of enterprise server 109. Scripts 308 can implement conference calls, call flow logic, business logic, user preferences, call service processes, and various other features and applications.

According to an alternative embodiment, while PBX server 300 can perform the functions of terminating and/or bridging media streams, call control functions are largely handled by enterprise server 109. In this embodiment, enterprise server 109 is a call control server. This architecture can be referred to as the "Third-Party Call Control."

According to this embodiment, enterprise server 109 is coupled to PBX server 300, for example, via a connection 302 through a local area network (LAN), enabling packet-based communications and, more specifically, IP-based communications. In some embodiments, communications between PBX server 300 and the enterprise server 109 are carried out in accordance with SIP. In other words, enterprise server 109 uses SIP-based communications to manage the set up, tear down, and control of media handled by PBX server 300. In some embodiment, enterprise server 109 can employ a communications protocol conforming to the ECMA-269 or ECMA-323 standards for Computer Supported Telecommunications Applications (CSTA).

FIG. 3B shows yet another example embodiment of the enterprise communications platform 105. This embodiment reflects the adaptation of an existing set of call processing scripts to an architecture that relies on third-party call control, with separate call control and media handling Enterprise server 109 in this embodiment can include a call processing server 318. Call processing server 318 includes the scripts or other modules for performing call handling functions. Enterprise server 109 can also include a SIP server 314 and a media server 316. SIP server 314 and media server 316 logically separate the call control from media handling. SIP server 314 interacts with call processing server 318 using a computer-implemented communications handling protocol, such as one of the ECMA-269 or ECMA-323 standards. These standards prescribe XML-based messaging for implementing Computer Supported Telecommunications Applications (CSTA).

Furthermore, SIP server 314 interacts with media server 316 using SIP-based media handling commands. For example, SIP server 314 and media server 316 can communicate using Media Server Markup Language (MSML) as defined in IETF document Saleem A., "Media Server Markup Language", Internet Draft, draft-saleem-msml-07, Aug. 7, 2008, which is incorporated by reference in its entirety. Media server 316 can be configured to perform Host Media Processing (HMP).

Other architectures or configurations for enterprise communications platform 105 will be appreciated by those ordinarily skilled in the art.

Figure 4:
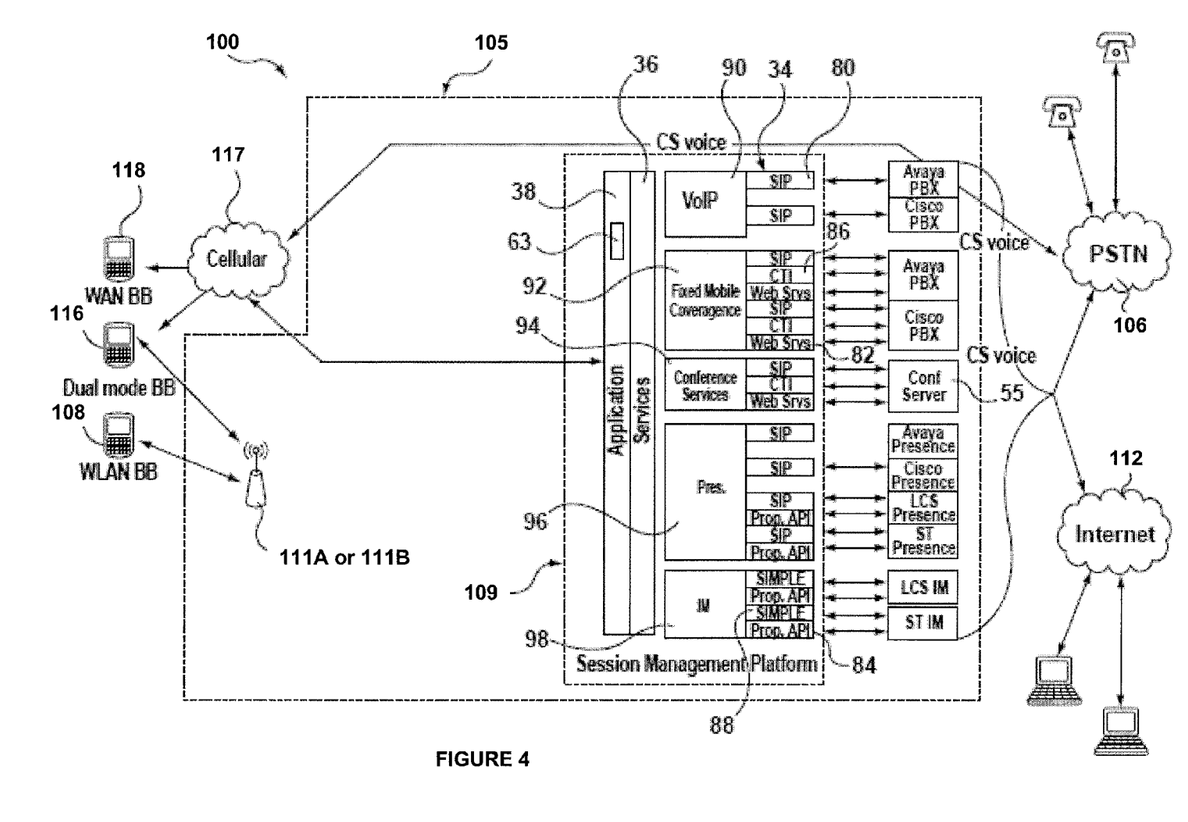
FIG. 4 shows further details of the enterprise communications platform.

Reference is now made to FIG. 4, which shows another example embodiment of enterprise communications platform 105 with a Third Party Call Control architecture. In this embodiment, enterprise server 109 is a multi-layer platform that can include a protocol layer 34, a services layer 36, and an application layer 38. Protocol layer 34 includes a plurality of interface protocols configured for enabling operations of corresponding applications in application layer 38. Services layer 36 includes a plurality of services that can be leveraged by the interface protocols to create richer applications. Additionally, application layer 38 includes a plurality of applications that communicate with the communication devices for corresponding services and interface protocols for enabling the communications such as voice or video calls.

Specifically, protocol layer 34 preferably includes protocols that allow media data to be controlled separately from other types of data. For example, protocol layer 34 can include, among other things, a plurality of interface protocols, such as a Session Initiation Protocol (SIP) 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. Furthermore, interface protocols 80-88 are plug-ins that can interface directly or indirectly with corresponding servers connected to enterprise network 111.

For example, SIP 80 is specified in the IETF (Internet Engineering Task Force) standard for multimedia session management. It is an application-layer control protocol for establishing, maintaining, modifying, and terminating multimedia sessions between two or more terminal devices. As further known by those of ordinary skill in the art, SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the terminal device is a non-specific entity or not registered (i.e., when communicating between two network entities). In contrast, the SIP-L interface is utilized when the terminal device is registered (i.e., when dialing to a specific extension). Specific operations of system 100 utilizing SIP 80 will be described in further detail below. In addition, system 100 can operate using any of the above disclosed protocols.

Enterprise server 109 also includes a plurality of enablers, among other things, a VoIP enabler 90, a Fixed Mobile Convergence or FMC enabler 92, a conference services enabler 94, a presence enabler 96, and an Instant Messaging (IM) enabler 98. Each of enablers 90-98 are used by corresponding services in services layer 36 that combine one or more of the enablers. Each of the applications in application layer 38 is then combined with one or more of the services to perform the desired application. For example, a phone call service can use the VoIP or PBX enabler (now shown), and an emergency response application can use the phone call service, an IM service, a video call service, and email service and/or a conference service.

Application layer 38 can include a conference services application 63 that, together with conference services enabler 94, enables multiple communication devices, including wireless mobile device, wired telephone sets, and personal computers running voice/video call programs, to participate in a conference call through use of a centralized conference server 55. As illustrated in FIG. 4, conference server 55 is provided in enterprise communications platform 105 and is in communication with conference services enabler 94 preferably through SIP protocol 80, although it is recognized that additional protocols that control media separate from data can be appropriated, such as Web Services protocol 82 or CTI protocol 86. As will be described in further detail below, conference call server 55 is configured for directing media and data streams to and from the terminal devices connected to system 100.

Example conference call systems and methods in accordance with various embodiments will now be described with reference to FIG. 5A, which shows another example embodiment of system 100 when used for a conference call system. As discussed above, enterprise communications platform 105 includes a conference server 55 for providing conference call services to the terminal devices connected to system 100 as depicted in FIG. 1. Although FIG. 5A only shows mobile devices 108, 116, and 118 and telephone set 117, other terminal devices can also be included in the system as will be appreciated by those of ordinary skill in the art. The terminal devices can collectively form one or more conference call groups according to various embodiments described herein. For example, terminal device 116, as a host terminal device, moderates a conference call session joined by one or more terminal devices, such as terminal devices 107, 108, and 118. Host terminal device 116 can, for example, perform hosting or moderating functions including roll call, mute all, broadcast only, conference lock, etc. When a terminal device (e.g., 107, 108, and 118) joins a conference call session moderated by a host terminal device (e.g., 116), it is designated as a participant terminal device.

Enterprise communications platform 105 and the associated conference server 55 can be used for executing conference call functions described herein. As described above, in example embodiments, enterprise communications platform 105 can include or be coupled to media server 316 shown in FIG. 3B, such that enterprise communications platform 105 controls the media handling and media sessions of media server 306.

Figure 5A:
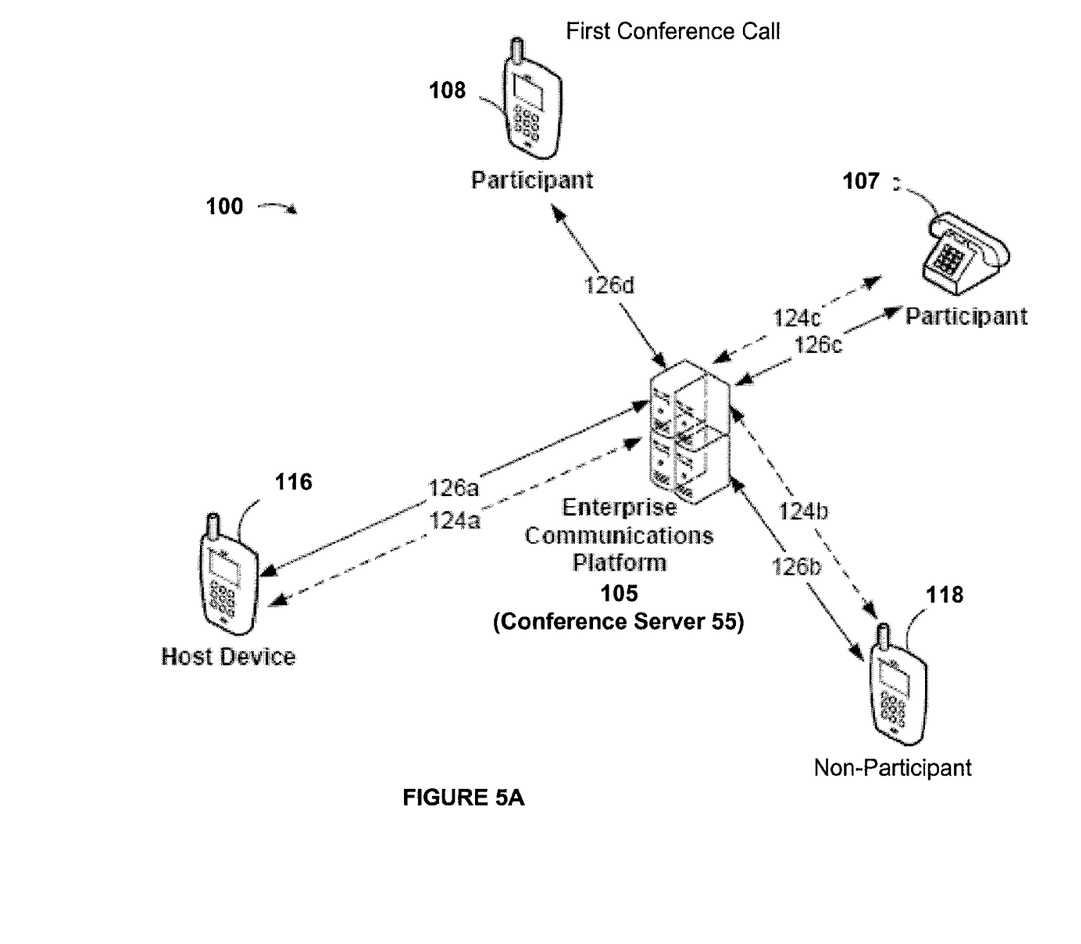
FIG. 5A shows a conference call system including the enterprise communications platform and the terminal devices shown in FIG. 1.

Referring still to FIG. 5A, to implement the conference call functions described herein, enterprise communications platform 105 can communicate with terminal devices 107, 108, 116, and 118 by way of media sessions or control sessions. Specifically, as shown in FIG. 5A, terminal devices 107, 108, 116, and 118 communicate via media sessions 126 (shown as solid lines) and control sessions 124 (shown as dashed lines). For example, terminal device 116 can communicate via media session 126a and control session 124a. Terminal device 118 can communicate via media session 126b and control session 124b. Terminal device 117 can communicate via media session 126c and control session 124c. In some embodiments, as shown, the terminal device, such as terminal device 108, can communicate via a media session 126d, without an associated control session, over PSTN 106, WAN 113, or PLMN 117 as depicted in FIG. 1.

In some example embodiments, the media sessions can be facilitated by enterprise communications platform 105 by way of Real-time Transport Protocol (RTP) media sessions, and can include voice calls, video calls, circuit-switched calls, or VoIP calls. To generate or establish a conference call session, enterprise communications platform 105 can connect or link at least some of the call legs of each media session 126. The particular methods and processes for connecting media sessions 126 into a conference call session would be understood by those skilled in the art, which can for example be implemented by media shuffling or Session Description Protocol (SDP) media shuffling, etc.

In some example embodiments, a data connection (e.g., the same data connection as used by control sessions 124) can be further used to provide additional data sharing between terminal devices 107, 108, 116, and 118. For example, during a conference call, host terminal device 116 can provide or transfer a data file to remaining terminal devices 107, 108, and 118. Data sharing can also include Web Services or sharing of presentation content.

The general operation of system 100 for managing conference calls will be discussed with references to FIG. 5A. For example, as depicted in FIG. 5A, a first conference call can be established to include several terminal devices (e.g., terminal devices 107, 108, and 116), with one of the terminal devices being the host terminal device (e.g., terminal device 116) and other terminal devices being the participant terminal devices (e.g., terminal devices 107 and 108). A terminal device that does not participate in the first conference call is designated as a non-participant terminal device. The process of establishing the first conference call is known in the art.

During the first conference call, conference server 55 receives a request for adding a non-participant terminal device (e.g., terminal device 118). The request for adding a non-participant terminal device can be generated by or originate from a number of network entities. Using FIG. 5A as an example, during the first conference call, host terminal device 116 can request that non-participant terminal device 118 join the conference. Specifically, host terminal device 116 can put on hold the call session associated with the first conference call and dial the identification number of non-participant terminal device 118. Conference server 55 receives a conference call request from host terminal device 116 including the number (e.g., extension number) assigned to non-participant terminal device 118. Accordingly, conference server 55 can then attempt to establish a call session with non-participant terminal device 118 in response to the request.

Alternatively, one of the participant terminal devices, such as terminal device 107 or 108, can initiate the request for adding the non-participant terminal device (e.g., terminal device 118). For example, during the first conference call, terminal device 107 or 108 can dial the number assigned to non-participant terminal device 118. Accordingly, conference server 55 receives a call request including the number assigned to non-participant terminal device 118 from the requesting participant terminal device. Accordingly, conference server 55 can attempt to establish a call session with non-participant terminal device 118 in response to the request.

Still alternatively, the request for adding a non-participant terminal device can be initiated by the non-participant terminal device itself. For example, non-participant terminal device 118 can dial a number assigned to conference call server 55 to establish a call session with conference call server 55. After the call session between conference call server 55 and non-participant terminal device 118 is established, non-participant terminal device 118 can send a request to conference server 55 to join the first conference call. The request can include an identifier that identifies the first conference call hosted by host terminal device 116.

Still alternatively, non-participant terminal device 118 can dial the number assigned to host terminal device 116 or a participant terminal device 107 or 108. After receiving the incoming call from non-participant terminal device 118, host terminal device 116 or participant terminal device 107 or 108 can choose to send a conference call request to conference server 55 to add the newly established call session to the first conference call In general, after receiving the request for adding a non-participant terminal device into the first conference call, conference server 55 attempts to merge the newly established call session with non-participant terminal device 118 into the first conference call. Because of the limitations of various system resources, however, such as the maximum number of media sessions or control sessions that can be supported by host terminal devices 116, PBX 300, or enterprise server 109, the first conference call can generally accommodate up to a certain number of participant devices. When the maximum number of participant devices is reached in the first conference call, conference server 55 will not be able to add non-participant terminal device 118 to the conference unless a participant terminal device (e.g., terminal device 107 or 108) is dropped from the conference or other measures are taken.

To accommodate non-participant devices in the conference even after the maximum number of participant devices is reached in the first conference call, conference server 55 allows chaining of a plurality of conference calls. Specifically, conference server 55 determines if the maximum number of participant terminal devices has been reached in the first conference call. For example, when the first conference call is initiated, conference server 55 can determine the maximum number of participant terminal devices for the first conference call. As discussed above, this maximum number of participant terminal devices can be determined based on the resources of various system components, such as host device 116, PBX server 104A or 104B, or enterprise server 109.

Conference server 55 can then establish a record in its database for the first conference call. The record can indicate the maximum number of participant terminal devices allowable for the first conference call and the number of participant terminal devices currently included in the first conference call. For example, as shown in FIG. 5A, the number of participant terminal devices in this embodiment is two. Additionally, conference server 55 can also update this record when a non-participant terminal device joins or a participant terminal leaves the first conference call. The number of participant terminal devices can be increased or decreased, accordingly. Additionally, conference server 55 can update the record when there is a change in available resources of system 100 due to other events or changes as readily recognized by one of ordinary skill in the art. For example, conference server 55 can update the record to increase the maximum number of participant terminal devices for the first conference call when the number of conference calls established on conference server 55 or PBX server 200 decreases due to termination of other conference calls.

Upon receiving the request for adding non-participant terminal device 118 as discussed above, conference server 55 can query its database to determine if the maximum number of participant terminal devices in the first conference call has been reached. For example, conference server 55 can compare the maximum number of participant terminal devices allowable in the first conference call with the number of participant terminal devices currently included in the first conference call.

Alternatively, upon receiving the request for adding non-participant terminal device 118, conference server 55 can query various components of system 100 to determine if any resources are still available to accommodate non-participant terminal device 118 in the first conference call. For example, conference server 55 can query host device 116, which can respond with an indication specifying if existing media sessions or control sessions associated with the participant terminal devices have occupied all of its resources. As another example, conference server 55 can query PBX 104A or 104B. Generally, PBX 104A or 104B assigns a limited amount of resources to each conference call established thereon. In response to the query, PBX 104A or 104B can send an indication to conference server 55 specifying whether it has additional resources available for adding non-participant terminal device 118 to the first conference call. It will be appreciated by one ordinary skilled in the art that conference server 55 can also query other system components of system 100 in a similar process.

If conference server 55 determines that the maximum number of participant terminal devices for the first conference call has not been reached, conference server 55 then proceeds to adding non-participant terminal device 118 to the first conference call, as known in the art.

If, on the other hand, conference server 55 determines that the maximum number of participant terminal devices in the first conference call has been reached, conference server 55 then proceeds to establish a second conference call. The second conference call is hosted by one of the participant terminal devices (e.g., terminal device 107 or 108) of the first conference call. In addition, the second conference call includes non-participant terminal device 118, which is to be added but cannot be added to the first conference call.

For example, if conference server 55 determines that non-participant terminal device 118 cannot be added to the first conference call due to the limitations of resources on host terminal device 116, conference server 55 can query participant terminal devices 107 and 108 to determine which one of participant terminal devices 107 and 108 has available resources to host the second conference call with non-participant terminal device 118. In response to the query from conference server 55, participant terminal devices 107 and 108 can each send a response to conference server 55 with an indication whether they have the available resources needed to host the second conference call. Additionally, the responses from participant terminal devices 107 and 108 can specify the number of non-participant devices they each can additionally accommodate in the second conference call.

After receiving the responses from participant terminal devices 107 and 108, conference server 55 can identify one of the participant terminal devices to host the second conference call. This identification process can be based on a number of criteria. For example, conference server 55 can select a participant terminal device that can accommodate the largest number of additional non-participant devices. Specifically, if participant terminal device 107 indicates in its response that it can accommodate three non-participant terminal devices, and if participant terminal device 108 indicates in its response that it can accommodate two non-participant terminal devices, conference server 55 elects participant terminal device 107 to host the second conference call.

Alternatively, conference server 55 can select the participant terminal device based on the amount of resources available. For example, if participant terminal device 107 has more available resources than participant terminal device 108, conference server 55 can select participant terminal device 107 to host the second conference call.

Still alternatively, conference server 55 can select a participant terminal device to host the second conference call based on the connection between the participant terminal device and system 100. For example, if participant terminal device 107 is connected to system 100 through a wired connection, and if participant terminal device 108 is connected to system 100 through a wireless connection, conference server 55 can select participant terminal device 107 to moderate the second conference call, because the wired connection is generally more reliable and resilient than the wireless connection.

Still alternatively, conference server 55 can select the participant terminal device to host the second conference call based on the participant terminal device's own preferences or properties. For example, if participant terminal device 108 specified in its response that it prefers not to host any additional conference call, conference server 55 does not select participant terminal device 108 to host the second conference call. As another example, if participant terminal device 107 has higher computational power than participant terminal device 108, conference server 55 can select participant terminal device 107 to host the second conference call.

Still alternatively, if conference server 55 determines that the maximum number of participant terminal devices in the first conference call is reached due to the resource limitation of PBX 104A or 104B as discussed above, conference server 55 can select a participant terminal device to avoid establishing the second conference call on that PBX. For example, assuming participant terminal device 107 is associated with PBX 104A, if participant terminal device 108 is associated with PBX 104B, and if conference server 55 determines that all of the resources of PBX 104B are occupied, but that PBX server 104A still has available resources for additional conference calls, conference server 55 can select participant terminal device 107, which is associated with PBX 104A. Other methods for selecting the participant terminal device to host the second conference call will be recognized by those ordinary skilled in the art upon reading this disclosure.

After identifying the participant terminal device to host the second conference call, conference server 55 can then establish the second conference call to include the selected participant terminal device and the non-participant terminal device to be added. For example, assuming conference server 55 selects participant terminal device 107 to host the second conference call as discussed above, conference server 55 can send a message to participant terminal device 107 and instruct participant terminal device 107 to initiate the second conference call. Specifically, if no call session has been established between conference server 55 and non-participant terminal device 118, conference server 55 can extract the number assigned to non-participant terminal device 118 from the request for adding the non-participant device and then forward the number to participant terminal device 107. Conference server 118 can then instruct participant terminal device 107 to dial the number of non-participant terminal device 118. When non-participant terminal device 118 responds, conference server 55 establishes the second conference call including participant terminal device 107, as the host terminal device, and non-participant terminal device 118 as a participant terminal device.

Alternatively, instead of dialing the number assigned to non-participant terminal device 118, conference server 55 can instruct non-participant terminal device 118 to dial the number assigned to participant terminal device 107 to establish the second conference call. Still alternatively, conference server 55 can itself dial the number assigned to non-participant terminal device 118 on behalf of participant terminal device 107 or dial the number assigned to participant terminal device 107 on behalf of participant terminal devices 117 to establish the second conference call.

Still alternatively, if a call session has been established between conference server 55 and non-participant terminal device 118, conference server 55 can dial the number of participant terminal device 107. When participant terminal device 107 responds, conference server 55 merges the call session with non-participant terminal device 118 and the call session with participant terminal device 107 to establish the second conference call.

Other methods for establishing the second conference call will be recognized by those of ordinary skill in the art upon reading this disclosure. Furthermore, the terminal device that initiates the request for adding non-participant device 118 can be different from the terminal device that hosts the second conference call. For example, the request for adding non-participant terminal device 118 can be sent by participant terminal device 108, whereas the second conference call can be hosted by another participant terminal device, such as terminal device 107.

Figure 5B:
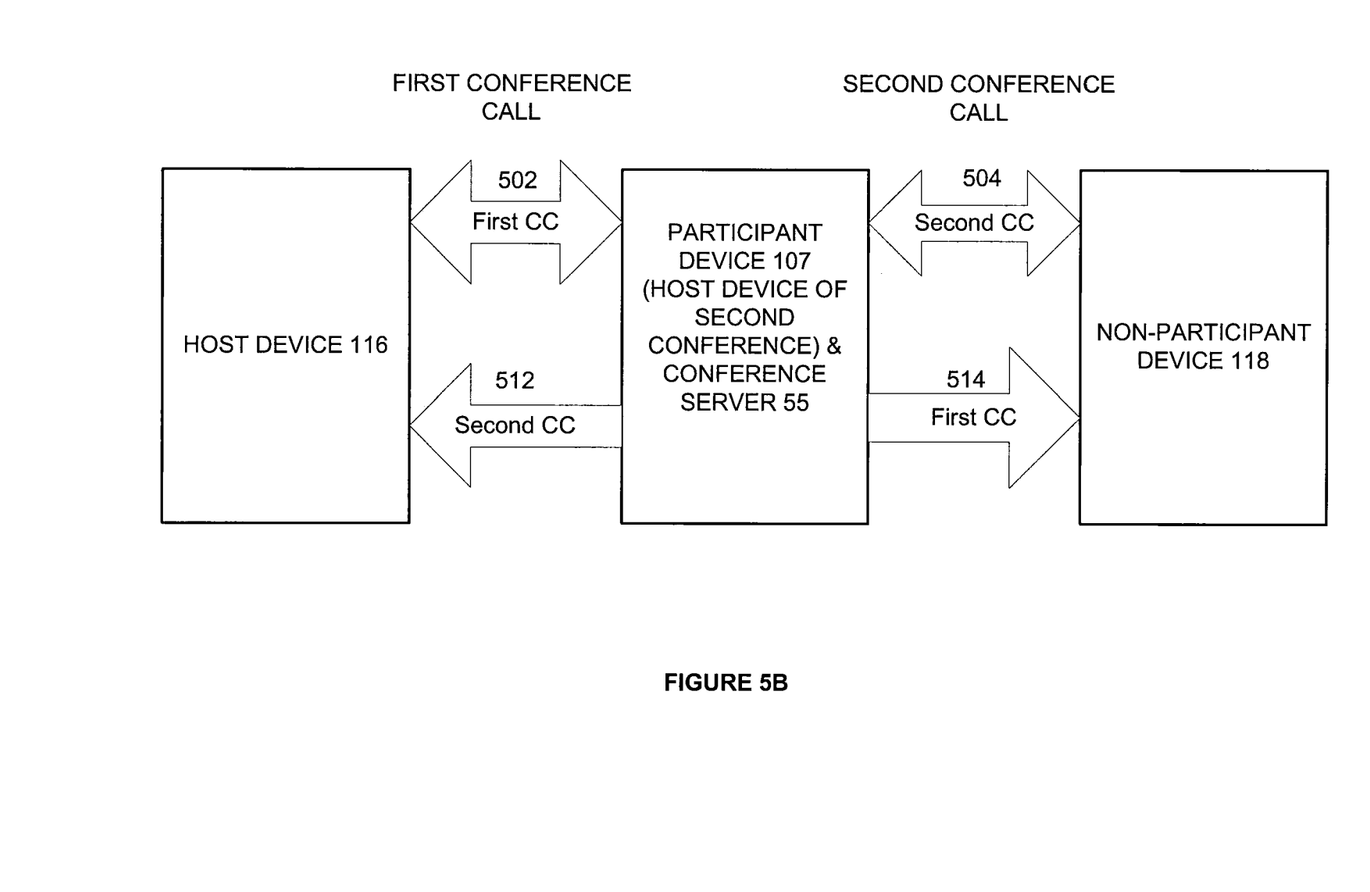
FIG. 5B shows an example process of chaining a first conference call and a second conference call according to one embodiment.

Upon establishing the second conference call, as shown in FIG. 5B, conference server proceeds to chaining the first conference call and the second conference call through the participant terminal device that hosts the second conference call (e.g., terminal device 107; conference server 55 and terminal device 107 are illustrated together for purposes of simplicity). Specifically, for the data 502 exchanged in the first conference call, conference server 55 forwards the exchanged first conference call (CC) data 514, including audio, video, etc., through terminal device 107 to non-participant device 118. Moreover, for the data 504 exchanged in the second conference call, conference server 55 forwards the exchanged second CC data 512 to the first conference call hosted by host terminal device 116. As a result, the terminal devices participating in the first conference call can communicate with the terminal devices participating in the second conference call, as if all terminal devices were in one conference call. Because the second conference call is hosted by terminal device 107, the conference call capacity of the host terminal device (e.g., terminal device 116) is extended without adding additional call sessions to the first conference call.

Furthermore, additional conference calls can be added according to a process similar to those described above for chaining the first and second conference calls. For example, if necessary, conference server 55 can establish a third conference call to accommodate additional non-participant devices. The third conference call can be hosted by a participant terminal device of the first conference call or a participant terminal device of the second conference call. If conference server 55 selects a participant terminal device of the first conference call to host the third conference call, conference server 55 chains the third conference call with the first conference call. If, on the other hand, conference server 55 selects a participant terminal device of the second conference call to host the third conference call, conference server 55 chains the third conference call with the second conference call. Regardless how the conference calls are chained together, conference server 55 can forward data among all of the conference calls so that the terminal devices participating in the separate conference calls can communicate with one another as if they were within a single conference call.

Still further, system 100 can chain conference calls even when the maximum number of participant devices of the hosting terminal device or the PBX is not reached. For example, when conference server 55 receives a request for adding non-participant terminal device 118 into the first conference call, conference server 55 can choose to establish the second conference call to accommodate non-participant device 118 even when the maximum number of participant devices of the first conference call is not yet reached. Conference server 55 can choose to do this to balance the call volume or traffic load between the PBX servers. For example, if the PBX (e.g., PBX 104B) associated with host terminal device 116 has a higher load than another PBX (e.g., PBX server 104A) associated with participant terminal device 107, conference server 55 can choose to establish the second conference call and request participant terminal device 107 to accommodate non-participant device 118 in the second conference call, instead of adding non-participant device 118 to the first conference call. As a result, non-participant terminal device 118 can be brought into the conference without adding additional call sessions to PBX 104B, which is associated with host terminal device 116.

Figure 6:
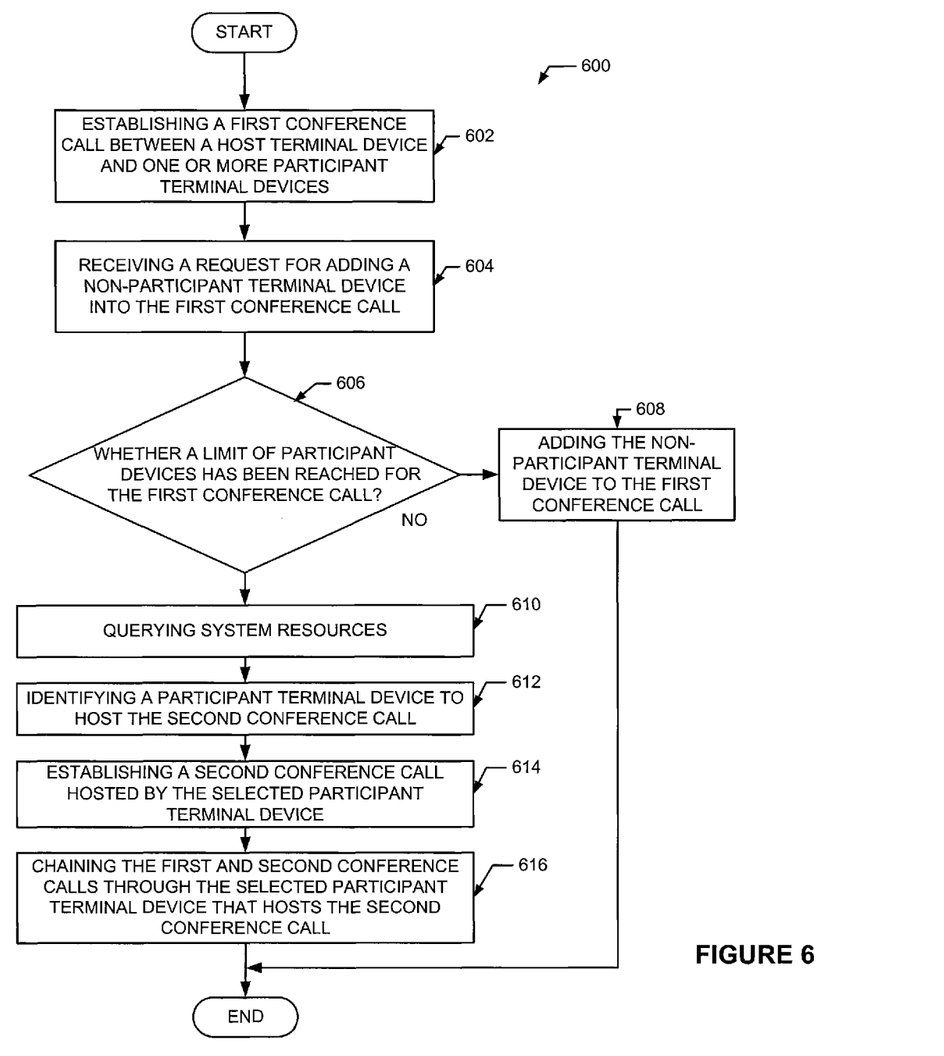
FIG. 6 shows, in flow diagram form, a method for managing conference calls using the system depicted in FIG. 1.

FIG. 6 illustrates a process 600 for managing conferences calls in an enterprise network in accordance with another example embodiment. While the flowchart discloses the following steps in a particular order, it is appreciated that at least some of the steps can be moved, modified, or deleted where appropriate.

As shown in FIG. 6, process 600 begins at step 602, where a first conference call is established by a conference server.

For example, the first conference call can be established between several terminal devices, with one of the terminal devices being a host terminal device and other terminal devices being participant terminal devices.

At step 604, the conference server receives a request for adding a non-participant terminal device to the first conference call. The request can be generated by or originate from a number of network entities as described above. In some embodiments, the conference server can establish a call session with the non-participant terminal device in response to the request before proceeding to step 606.

After receiving the request for adding the non-participant terminal device to the first conference call, the conference server can attempt to add the non-participant terminal device to the first conference call. Referring to FIG. 6, at step 606, the conference server determines if the maximum number of participant devices has been reached in the first conference call (e.g., as described above in FIG. 5A).

At step 606, if the conference server determines that the maximum number of participant terminal devices for the first conference call has not been reached, the conference server then adds (608) the non-participant device to the first conference call, as known in the art.

If on the other hand, the conference server determines that the maximum number of participant terminal devices in the first conference call has been reached, the conference server then proceeds to step 610 to query one or more participant terminal devices in the first conference call or to query other system component such as the PBX. For example, the conference server can query one or more of the participant terminal devices in the first conference call to determine which one of the participant terminal devices has the available resources to host the second conference call to include the non-participant terminal device. In response to the query from the conference server, the participant terminal devices in the first conference call each respond to the conference server with an indication whether they have the available resources to host the second conference call. Additionally, the responses from the participant terminal devices can specify the number of non-participant terminal devices they each can additionally accommodate in the second conference call. Similarly, the PBX can also respond to the query and indicates to the conference server whether it has resources available to host the second conference call.

At step 612, after receiving the responses from the participant terminal devices and other system components, the conference server can identify one of the participant terminal devices to host the second conference call. This identification process can be based on a number of criteria. For example, the conference server can select a participant terminal device that can accommodate the largest number of non-participant terminal devices. Alternatively, the conference server can select the participant terminal device that has the largest amount of available resources. Still alternatively, the conference server can select a participant terminal device to host the second conference call based on the connection used by the participant terminal device. Still alternatively, the conference server can select a participant terminal device to host the second conference call based on the participant terminal device's own preferences or properties.

Still alternatively, if the conference server determines that the maximum number of participant devices in the first conference call is reached due to a congested PBX (i.e., the resource limitation of the PBX is reached) as discussed above, the conference server can select a participant terminal device to avoid establishing the second conference call on the congested PBX. Other methods for selecting a participant terminal device to host the second conference call will be recognized by those ordinary skilled in the art upon reading this disclosure.

After identifying the participant terminal device, the conference server can then establish the second conference call at step 614. For example, the conference server can send a message to the participant terminal device selected at step 612 and instruct the selected participant terminal device to initiate the second conference call. Specifically, if no call session has been established between the conference server and the selected participant terminal device, the conference server extracts the number (e.g., phone number, extension number, PIN, etc.) of the non-participant terminal device to be added from the request and then forwards the number to the selected participant terminal device. The conference server then instructs the selected participant terminal device to dial the number of the non-participant terminal device. After the non-participant terminal device responds, the conference server establishes the second conference including the selected participant terminal device, as a host terminal device, and the non-participant terminal device, as a participant terminal device.

Alternatively, at step 614, instead of dialing the number of the non-participant terminal device, the conference server can instruct the non-participant terminal device to be added to dial the number assigned to the participant terminal device selected at step 612 to establish the second conference call. Still alternatively, the conference server can dial the number assigned to the non-participant terminal device on behalf of the participant terminal device selected at step 612 or dial the number assigned to the selected participant terminal device on behalf of the non-participant terminal device.

Furthermore, at step 614, if a call session has been established between the conference server and the non-participant terminal device, the conference server can dial the number assigned to the participant terminal device selected at step 612. After the participant terminal device responds, the conference server establishes the second conference call between the non-participant terminal device and the selected participant terminal device. Other methods for establishing the second conference call will be recognized by those ordinary skilled in the art upon reading this disclosure.

After establishing the second conference at step 614, the conference server then chains (616) the first conference call and the second conference call through the participant terminal device selected at step 612, which hosts the second conference call. Specifically, the conference server forwards the data of the first conference call, including audio, video, etc., to the second conference call through the selected participant terminal device. Similarly, the conference server forwards the data of the second conference call to the first conference call also through the selected participant terminal device. As a result, the non-participant terminal device which cannot be added to the first conference call can communicate with the host terminal device and the participant terminal devices of the first conference call, as if all devices were in one conference call. Because the second conference call is hosted on a terminal device, which is a participant terminal device of the first conference call, the conference call capacity of the host device of the first conference call is extended without adding additional call sessions to the first conference call.

Furthermore, additional conference calls can be further added according to a process similar to the those described above for chaining the first and second conference calls. For example, when the maximum number of participants in the second conference call is reached, the conference server can establish a third conference call to accommodate additional non-participant terminal devices if so desired. The third conference call can be hosted by a participant terminal device of the first conference call or a participant terminal device of the second conference call. If the third conference call is hosted by a participant terminal device of the first conference call, the third conference call is chained with the first conference call. If, on the other hand, the third conference call is hosted by a participant terminal device of the second conference call, the third conference call is chained with the second conference call. Regardless how the conference calls are chained together, the conference server can forward the data among all of the conference calls so that the participant devices in separate conference calls can communicate with one another as if they were within a single conference call.

Certain adaptations and modifications of the described embodiments can be made. Therefore, the above discussed embodiments are considered to be illustrative and not restrictive.

What is claimed is:

1. A method for managing conference calls in a communication system including a plurality of terminal devices, comprising:
    establishing a first conference call between a host terminal device and one or more participant terminal devices;
    receiving a request for adding a non-participant terminal device into the first conference call;
    selecting a participant terminal device from the one or more participant terminal devices to host a second conference call;
    establishing the second conference call hosted by the selected participant terminal device, wherein the second conference call includes the non-participant terminal device; and
    chaining the first conference call and the second conference call through the selected participant terminal device.

2. The method of claim 1, further comprising determining that a limit of participants of the first conference call has been reached.

3. The method of claim 2, wherein the determining that the limit of participants of the first conference call has been reached further comprising:
    determining whether a limit of resources of the host terminal device has been reached.

4. The method of claim 1, further comprising:
    querying at least one of the participant terminal devices for determining that a limit of resources of the selected participant device has not been reached.

5. The method of claim 1, wherein the request for adding the non-participant device to the first conference call is sent by one of the host terminal device, the non-participant terminal device, or any one of the participant terminal devices.

6. The method of claim 1, further comprising:
    sending a message to the selected participant terminal device for establishing the second conference call.

7. The method of claim 1, wherein establishing the second conference call after the non-participant terminal device has been dialed from one of the host terminal device, a server, or any one of the participant terminal devices.

8. The method of claim 7, wherein the server includes at least a private branch exchange server and a session management platform server, and wherein the determining that the limit of participants of the first conference call has been reached further comprising:
    determining whether a limit of resources of at least one of the private branch exchange server or the session management platform server has been reached.

9. The method of claim 1, wherein the host terminal device is included in a first network, the non-participant terminal device is included in a second network, and the first network and the second network communicate with each other through one or more connections.

10. A computer readable medium comprising computer-readable instructions, which, when executed by a processor, cause the processor to perform a method for managing conference calls, the method comprising:
    establishing a first conference call between a host terminal device and one or more participant terminal devices;
    receiving a request for adding a non-participant terminal device into the first conference call;
    selecting a participant terminal device from the one or more participant terminal devices to host a second conference call;
    establishing the second conference call hosted by the selected participant terminal device, the second conference call including the non-participant terminal device; and
    chaining the first conference call and the second conference call through the selected participant terminal device.

11. The computer readable medium of claim 10, further comprising computer-readable instructions, which, when executed by the processor, cause the processor to perform:
    determining that a limit of participants of the first conference call has been reached.

12. The computer readable medium of claim 11, wherein the determining that the limit of participants of the first conference call has been reached further comprising:
    determining whether a limit of resources of the host terminal device has been reached.

13. The computer readable medium of claim 10, further comprising computer-readable instructions, which, when executed by the processor, cause the processor to perform:
    querying at least one of the participant terminal devices for determining that a limit of resources of the selected participant terminal device has not been reached.

14. The computer readable medium of claim 10, wherein the request for adding the non-participant device to the first conference call is sent by one of the host terminal device, the non-participant terminal device, or any one of the participant terminal devices.

15. The computer readable medium of claim 10, further comprising computer-readable instructions, which, when executed by the processor, cause the processor to perform:
    sending a message to the selected participant terminal device for establishing the second conference call.

16. The computer readable medium of claim 10, further comprising computer-readable instructions, which, when executed by the processor, cause the processor to perform:
    establishing the second conference call after the non-participant terminal device has been dialed from one of the host terminal device, a server, or any one of the participant terminal devices.

17. The computer readable medium of claim 16, wherein the server includes at least a private branch exchange server and a session management platform server.

18. The computer readable medium of claim 17, wherein the determining that the limit of participants of the first conference call has been reached further comprising:
    determining whether a limit of resources of at least one of the private branch exchange server or the session management platform server has been reached.

19. The computer readable medium of claim 11, wherein the host terminal device is included in a first network, the non-participant terminal device is included in a second network, and the first network and the second network communicate with each other through one or more connections.

20. A system for managing conference calls between a plurality of terminal devices including a host terminal device configured to host a first conference call and one or more participant terminal devices configured to participate in the first conference call, the system comprising:

a server configured to receive a request for adding a non-participant terminal device to the first conference call, select a participant terminal device from the one or more participant terminal devices to host a second conference call, establish the second conference call hosted by the selected participant terminal device to include the non-participant terminal device, and chain the first conference call and the second conference call through the selected participant terminal device.

* * * * *